March 22, 1949. J. E. JOY 2,465,102
RADIO FREQUENCY HEATING APPARATUS
Filed Oct. 4, 1943
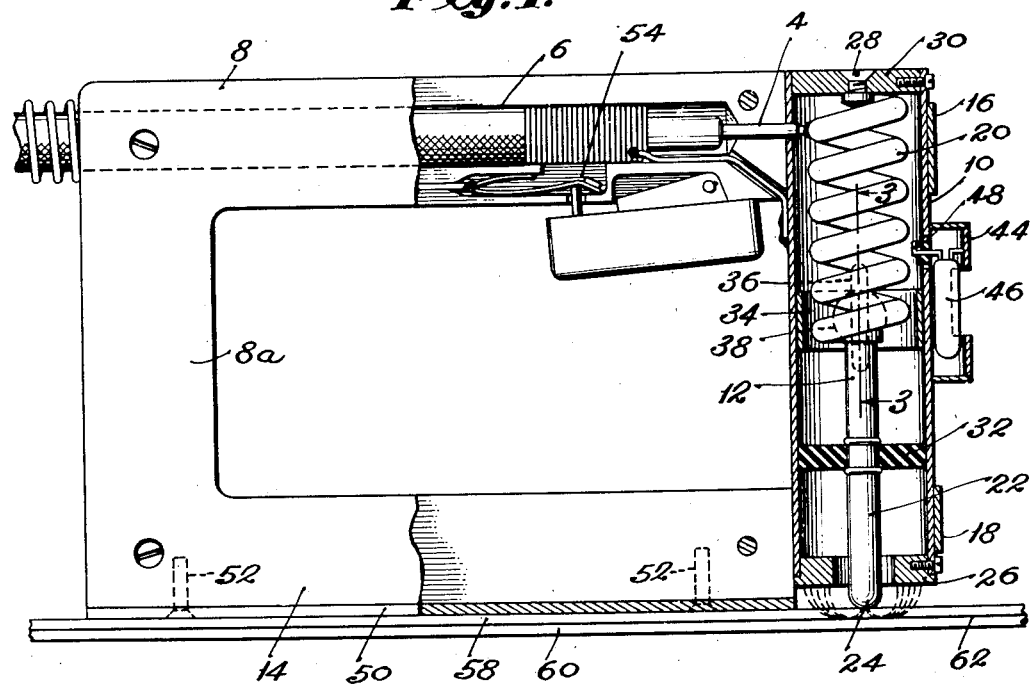
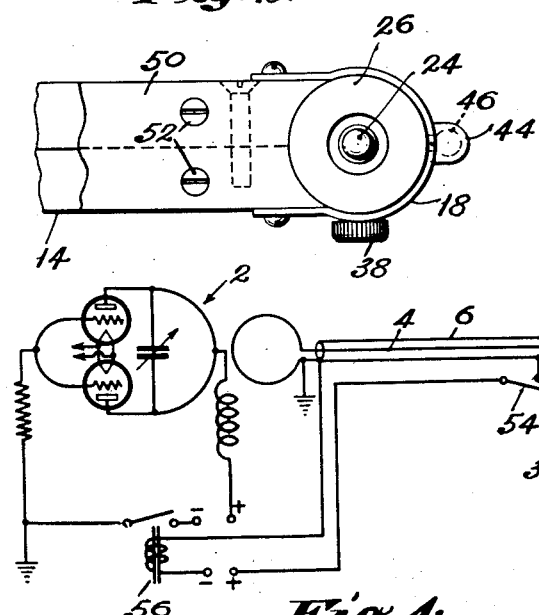
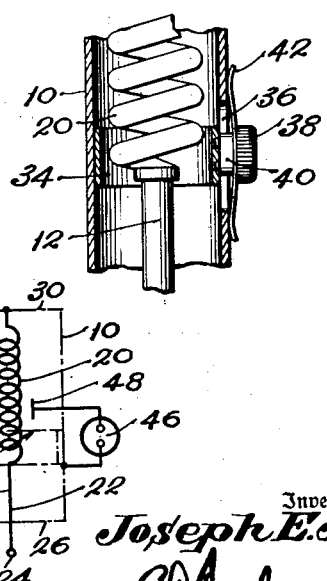
Inventor
Joseph E. Joy
Attorney Patented Mar. 22, 1949

2,465,102

UNITED STATES PATENT OFFICE 2,465,102

RADIO-FREQUENCY HEATING APPARATUS

Joseph Everett Joy, Collingswood, N. J., assignor to Radio Corporation of America, a corporation of Delaware Application October 4, 1943, Serial No. 504,845

4 Claims. (Cl. 219—47)

This invention relates to heating apparatus employing high frequency electrical energy, and more particularly it relates to apparatus adapted to unite layers of material.

In commercial practice, the uniting of curved surfaces is usually part of a molding or forming operation. A thermoplastic or thermo-setting bonding agent, such as glue, is applied to one or to both surfaces of each layer of the material; successive layers so treated are then wrapped tightly around a shaped mandrel; and the complete unit, enclosed in a rubber bag, is then placed in an autoclave, where the molding or forming operation as well as the uniting takes place under the influence of heat and pressure. For this operation to be successful it is essential that each layer be wrapped tightly and smoothly about the preceding one. Where the layers of material are of considerable area, as for example, where airplane bodies are made from comparatively thin and long strips of plywood veneer, the operation becomes one of some difficulty. It becomes necessary therefore to effect a temporary union between the first layer and the mandrel around which it has been wrapped, and between each succeeding layer and the previous layers. This is done so as to maintain the various layers and the mandrel as a composite unit until the whole operation has been completed. Hitherto the insertion of staples and the like at spaced points in the area of each layer has been the accepted method of holding the layers together temporarily, but this practice has been attended by many disadvantages, particularly because the staples have later to be moved. Accordingly heat from a source of high frequency electrical energy to effect the temporary union is being used in accordance with the teachings of the co-pending application of George H. Brown and Rudolph A. Bierwirth, Serial No. 543,134, filed July 31, 1942, now Patent No. 2,422,525, dated June 17, 1947, and assigned to Radio Corporation of America.

The apparatus for the practical application of heat from such a source of energy, consists in general of:

(a) A source of high frequency electrical energy, such as a high frequency oscillator, often of the "push-pull" type, (b) A concentric cable for the transfer of such energy from its source to the applicator next hereinafter described, (c) An applicator consisting of a pair of electrodes between the ends of which the required high frequency voltage appears; one of the said electrodes usually surrounds the other, is in spaced relation thereto, and is usually at zero potential so that the operator of the apparatus shall not come in contact with any dangerously high voltage.

With the voltages used, it sometimes happens that electrical tension between the electrodes of the apparatus is so great as to cause a voltage flash-over across the surface of the material to which the electrodes are applied, and then charring or actual burning of said material may result.

It is apparent that not only must burning or charring of the material be avoided, but at the same time sufficient heat to activate the glue or other adhesive must penetrate through the material, to the adhesive. Where the material to be joined is comparatively thick, this operation is attended with some difficulty.

A further difficulty in practice arises from the fact that varying thicknesses and varying humidity of both the material and adhesive cause the load presented to the heating apparatus to vary. This difficulty is overcome by tuning the apparatus for maximum voltage to meet the changing loading conditions. However it is awkward and sometimes impossible for the operator to turn away from the work in hand to tune the oscillator or other source of high frequency electrical energy.

It has been found desirable in practice to smooth out each layer of the material to be joined by a process akin to "ironing" immediately prior to effecting the temporary union, so that each layer will lie perfectly smoothly and tightly on the preceding one.

While the method and apparatus embodied in this invention has been designed with a view to effecting temporary unions at spaced points prior to a final process, the invention is equally applicable to the formation of a permanent bond over the whole area of the materials to be united. In addition, in the case of certain materials, and under appropriate conditions, it is possible to dispense with the use of any adhesive, and to fuse or weld the materials to be joined themselves, using the apparatus and methods described herein.

The primary object therefore of this invention is to provide an improved method of and apparatus for joining layers of material either temporarily or permanently by the use of heat from a source of high frequency electrical energy.

More particularly, it is an object of this invention to provide an improved method of and apparatus for uniting layers of material which will eliminate the need for extraneous bonding materials and which will make use of only the materials entering into the final structure.

Another object of this invention is to provide improved heating apparatus which will eliminate the possibility and danger of voltage flash-over across the surface of the material to be bonded, and which will not result in burning or charring of said material nor in other damage thereto.

An additional object of this invention is to provide improved heating apparatus which will enable heat to penetrate to the stratum of glue or other adhesive, or where no such agent is used, then to the interfaces of the material to be united.

A further object of this invention is to provide improved heating apparatus which may be conveniently adjusted to meet varying loading conditions.

A still further object of this invention is to provide improved heating apparatus for rendering smooth the layers of material to be united when said apparatus is brought into engagement therewith.

It is also an object of this invention to provide improved heating apparatus which is simple in construction, inexpensive in cost and highly efficient in use.

In order to achieve these objects, the electrodes are so arranged that one will protrude beyond the other, whereby only one electrode contacts the material. Heating, therefore, takes place in the stray field set up between the two electrodes, and not in the field where lines of force run directly from one electrode to the other. There is only one point of contact between the applicator and the work. This eliminates voltage flash-over, and the resultant possibility of charring or burning the material to be bonded, which may occur if both electrodes make contact with the work. It also enables the heat to penetrate much further than formerly.

A ring of conductive material, preferably copper, is inserted inside the outer electrode and spaced from the inner electrode so that its longitudinal movement within the outer electrode may be controlled from the outside of said electrodes. The apparatus may be tuned by movement of said ring which results in alteration of the inductance of the inner electrode, and variation of the effective electrical capacity between the two electrodes.

A smoothing plate at the bottom of the apparatus in the same plane as the protruding electrode is brought into engagement with the surface of each layer of material to be bonded, and is thus made perfectly smooth immediately prior to the heating operation.

These and other features of this invention will appear more clearly from the accompanying drawing, which illustrates apparatus suitable for carrying out the same. In the drawing:

Fig. 1 is a longitudinal sectional view, partly in elevation, of one embodiment of the invention, Fig. 2 is a bottom plan view of the electrode structure shown in the right-hand portion of Fig. 1, Fig. 3 is a sectional view taken along the line 3—3 of Fig. 1, and Fig. 4 is a schematic diagram of one embodiment of the electrical circuit of the apparatus.

Referring to Figs. 1 and 4, high frequency electrical energy is transferred from the oscillator 2, by means of the flexible concentric cable 4, 6 through the insulated handle and supporting member 8, of the applicator 8a, to the electrodes 10, 12.

The cylindrical metal electrode 10 is attached to the handle 8 and to the lower part 14 of a U shape supporting member by means of straps 16, 18. The inner electrode 12 consists of a coil 20 of approximately six turns, and a terminal portion 22. By way of example the inner electrode may be made of one-quarter inch brass rod which is rounded off at the tip 24. The outer electrode 10 is provided at its lower end with an annular terminal member 26, spaced from and concentric with the tip 24.

The top of the inner electrode 12 is soldered to a screw 28 in the circular plate 30 at the top of the outer electrode 10, and is thereby held in rigid contact therewith. The two electrodes 10, 12 may also be held in spaced relation by the insulated spacer 32. The tip 24 of the inner electrode 12 protrudes about three-sixteenths of one inch beyond the outer plane of the annular terminal member 26. The inner conductor 4 of the concentric line is connected to the coil 20 at a point of suitable impedance, and the outer conductor 6 of said concentric line is connected to the outer electrode 10.

In the disclosure of the above identified patent, the electrodes 10 and 12' represented a quarter wavelength at the operating frequency, usually about 200 megacycles per second. In the present embodiment, the electrodes are much shorter, but the same electrical effect is obtained by the added inductance of coil 20.

A tuning ring 34 is slidably mounted within the outer electrode 10. This electrode has a longitudinal slot 36 at one side thereof. A knob 38 on the outside of said slot is connected by the shaft 40 to the tuning ring 34. The tuning ring 34 may therefore be moved up and down within the outer electrode 10 by means of the knob 38. Ordinarily the ring 34 is held in position by the leaf spring 42.

A casing 44 secured to the outside of the outer electrode 10 holds a neon bulb 46. One terminal of said bulb is connected electrically to the electrode 10, and the other to a piece of wire 48, in the field of the coil 20.

A smoothing plate 50 is attached to the lower supporting member 14 of the applicator 8a by screws 52, 52. The lower surface of said plate is in the same plane as the extreme lower end of the tip 24.

In operation, when the switch 54 is closed it actuates the relay 56 which connects the anode circuits of the oscillator 2 to the power supply (not shown). The oscillator establishes a high frequency electric field between the tip 24 of electrode 12 and the annular terminal member 26 of electrode 10. The applicator is then applied to the outer surface of two layers of material 58, 60 to be united. Pressure on the applicator causes the plate 50 to engage said surface, and render the two layers perfectly smooth.

Since the tip 24 protrudes beyond the plane of the annular terminal member, the lines of force, which cut the interface of the two layers of material 58, 60, are mainly in the stray field between the two electrodes. Since there is only one point of contact between the applicator and the work, the danger of voltage flash-over and of consequent charring or burning is entirely eliminated. Moreover the electric field, and hence its heating effect, may penetrate much further than where the terminal portions of the two electrodes are both in contact with the material.

Heat, thus established, softens the glue or other thermo-plastic or thermo-setting adhesive, and thereby causes the union of the layers of material either temporarily or permanently. As previously explained, under appropriate conditions, the use of an adhesive may be dispensed with entirely, and heat may be applied to fuse or weld the layers of material themselves.

It is not essential that the electrodes should be rigid; they must however be so arranged that when brought into co-operative engagement with the material to be joined, one electrode will protrude beyond the other.

When work is done on material of varying thickness, or varying humidity alters the load presented to the apparatus, it becomes necessary to tune the electrodes. This is done quickly and easily by operation of the knob 38. The slot 36 is of such length that when the knob 38 is in the lowest position the ring 34 does not cover any part of the coil 20, and at the other extreme (when the knob is at the top of the slot) the ring covers completely the lowest turn of said coil.

This provides a tuning range which has been found to be completely adequate in practice. Operation of the knob 38, and consequent movement of the ring 34, has the following effects:

(a) It alters the inductance of coil 20.

(b) It alters the electrical capacity between the two electrodes.

(c) It alters the ratio of the effective inside diameter of the outer electrode to the outside diameter of said coil.

The optimum position of knob 38 is when the neon bulb 46 glows most brightly. The operator of the apparatus does not need to turn away at all from the work in hand to observe when this optimum condition is obtained.

The apparatus described herein has been found to work with comple' satisfaction for uniting material of thicknesses of the order of one-eighth of an inch with oscillators having an available power output of from 100 to 300 watts. By way of example, laminations of wood and of plastic compounds of paper and fabric have been so united.

I claim as my invention:

1. Heating apparatus employing high frequency electrical energy including an outer tubular electrode, an inner electrode, part of which is in the form of a helix extending longitudinally within said outer electrode and a conductive ring slidably positioned on and within said outer electrode and in spaced relation to said inner electrode, said outer electrode having a longitudinal slot at one side thereof and a knob on the outside of said slot and slidably mounted therein connected to said ring, whereby said ring may be caused to slide over one or more turns of said helix.

2. In heating apparatus employing high frequency electrical energy to unite layers of material, the combination of a supporting element, an outer tubular electrode extending from one side of said supporting element, a spaced inner cylindrical electrode concentric with said outer electrode, said inner electrode also extending from the same side of said supporting element with one of said electrodes projecting beyond the terminal portion of the other and a smoothing element rigidly attached to said supporting element and disposed in a plane including the terminal portion of said projecting electrode whereby said smoothing element is adapted to press together said layers.

3. In heating apparatus employing high frequency electrical energy to unite layers of material, an applicator including a pair of electrodes one of which projects beyond the other and adapted to cooperate with an outermost surface of said layers, and a smoothing element rigidly connected to at least one of said electrodes and disposed in a plane including a terminal portion of said projecting electrodes, whereby said smoothing element is adapted to press said layers together.

4. In heating apparatus employing high frequency electrical energy to unite layers of material, the combination of a U shape supporting element, a structure containing electrodes carried by and connecting the ends of said U, one portion of said U constituting a handle for the manual operation of said apparatus and another portion of said U being adapted to be passed over said layers in engagement therewith for rendering said layers smooth.

JOSEPH EVERETT JOY.

REFERENCES CITED

The following references are of record in the file of this patent:

UNITED STATES PATENTS

| Number | Name | Date |
| --- | --- | --- |
| 1,555,258 | Allcutt | Sept. 29, 1925 |
| 1,867,901 | Walter | July 19, 1932 |
| 1,976,378 | Vrooman | Oct. 9, 1934 |
| 2,045,523 | Fassler | June 23, 1936 |
| 2,153,131 | Bohme | Apr. 4, 1939 |
| 2,179,261 | Keller | Nov. 7, 1939 |
| 2,248,840 | Wilkoff | July 8, 1941 |
| 2,280,771 | DuFour et al. | Apr. 28, 1942 |
| 2,293,851 | Rogers | Aug. 25, 1942 |
| 2,321,131 | Crandell | June 8, 1943 |
| 2,342,846 | Crandell | Feb. 29, 1944 |

FOREIGN PATENTS

| Number | Country | Date |
| --- | --- | --- |
| 516,783 | Germany | Jan. 29, 1931 |